June 10, 1952 R. N. HARMON ET AL 2,600,243
MODULATOR SYSTEM
Filed May 15, 1950
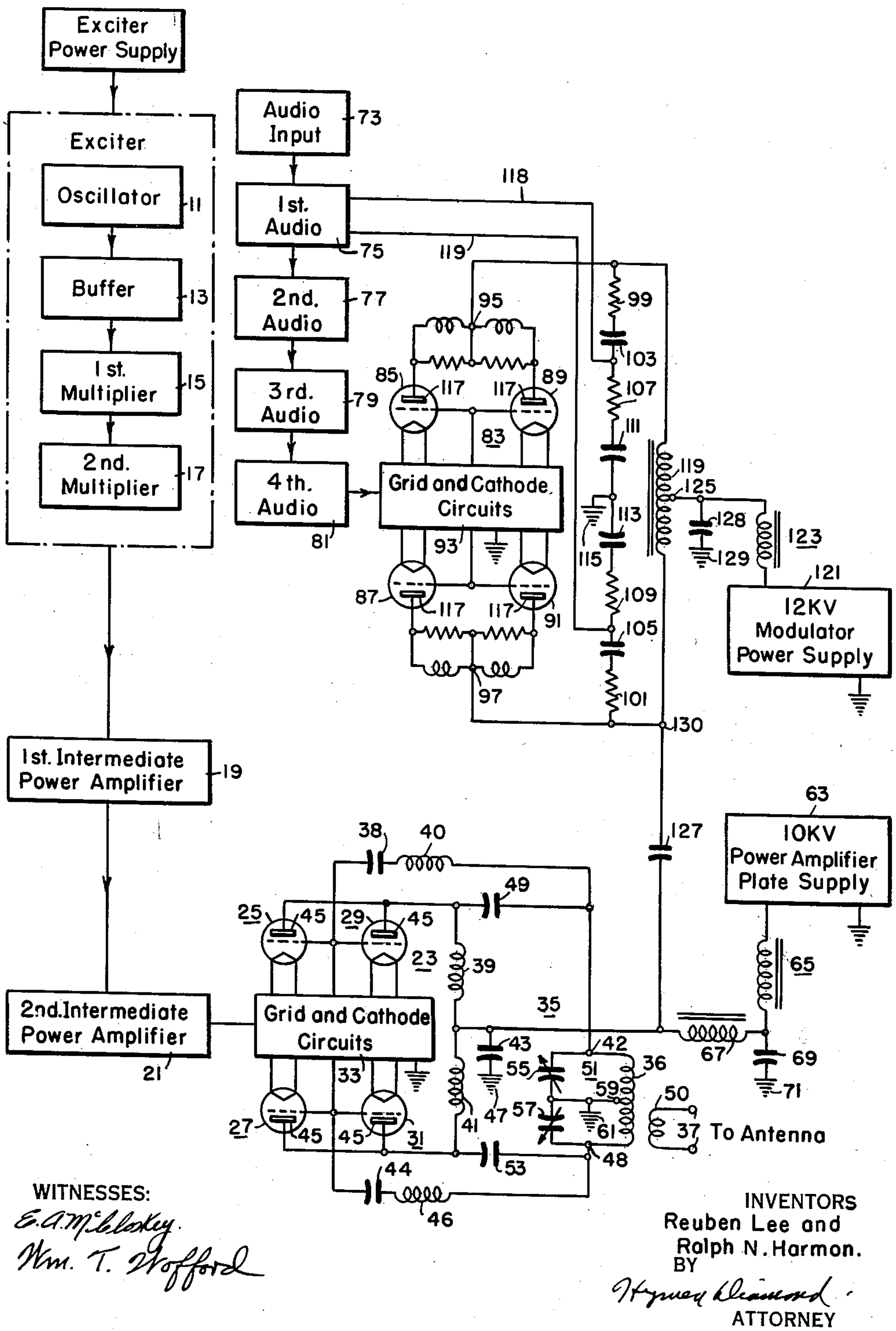
WITNESSES:
E. A. McCloskey
Wm. T. Wofford
INVENTORS
Reuben Lee and
Ralph N. Harmon.
BY
Hymen Diamond
ATTORNEY Patented June 10, 1952 2,600,243

UNITED STATES PATENT OFFICE 2,600,243

MODULATOR SYSTEM

Ralph N. Harmon, Baltimore, and Reuben Lee, Linthicum Heights, Md., assignors to Westinghouse Electric Corporation, East Pittsburgh, Pa., a corporation of Pennsylvania Application May 15, 1950, Serial No. 162,114

6 Claims. (Cl. 332—43)

Our invention relates to electronic circuits and, more particularly, to a system of high level modulation.

One system conventionally used for amplitude modulation of power amplifiers employs a modulation transformer which connects the modulator tubes through a coupling capacitor across a reactor, which is in turn connected to the plates of the amplifier tubes. A single anode power supply is connected to the midpoint of the modulation transformer primary winding and to the low voltage side of the reactor. This system is objectionable because the modulation transformer is likely to be large and costly. Moreover, its leakage reactance and distributed capacitance tend to cause frequency, phase, and harmonic distortion at the high and low ends of the audio-frequency range. Feedback used to correct such distortion usually cannot be derived from the secondary side of the modulation transformer, and so the beneficial effects of such feedback are limited.

Another system of the prior art of which we are aware utilizes an autotransformer which connects the modulator tubes through a coupling capacitor across a reactor which is in turn connected through a resistance and a radio-frequency choke to the anode circuit of a radio-frequency amplifier. The midpoint of the autotransformer is connected to the low voltage side of the reactor and also to a single D. C. anode potential supply which is common to both the modulator and the radio-frequency amplifier. Such a system is incapable of 100% modulation unless additional radio-frequency amplification stages are inserted. This latter system is exemplified by Patent No. 2,226,214 to H. D. Albrecht.

It is an object of our invention to provide a system of modulation which avoids the objectionable features of prior art systems.

Another object of our invention is to provide a system of high level modulation wherein the advantages of feedback can be utilized and 100% modulation can be obtained.

Another object of our invention is to provide a high lever modulation capable of 100% modulation which does not employ a bulky and costly modulation transformer.

In accordance with our invention, the anodes of the modulator tubes which may be connected in push-pull relation are joined through a center-tapped reactance which is coupled by a capacitor to the anode circuit of the radio-frequency amplifier. We provide two independent D. C. anode power supplies, one of which is connected through a modulation reactor to the radio-frequency amplifier anode circuit and the other of which is connected to the midpoint of the center-tapped reactance to supply D. C. anode potential to the modulator. The magnitude of the potential of the modulator power supply is made sufficiently greater than the potential of the radio-frequency amplifier power supply that 100% modulation can be obtained.

Other objects and advantages of our invention will appear from the following description when read in connection with the accompanying drawing in which the single figure is a schematic diagram showing a preferred embodiment of our invention.

The single figure of the drawing shows our invention as applied to the conventional radio transmitter. The various stages of the transmitter, which are conventional and do not constitute the subject matter of our invention, are shown in the drawing as blocks in a line diagram. The radio-frequency section comprises stages which are coupled in the following order: oscillator 11, buffer 13, first multiplier 15, second multiplier 17, first intermediate power amplifier 19, and second intermediate power amplifier 21. The second intermediate power amplifier is coupled to the power amplifier, indicated generally at 23. The power amplifier includes two pairs of paralleled amplifier tubes 25, 27 and 29, 31, respectively, connected in balanced push-pull relation. The grid and cathode circuits of the power amplifier are conventional and are, therefore, shown as a block 33. The power amplifier output is taken through a symmetrical network 35 to the antenna input terminals 37.

This network includes a pair of radio frequency chokes 39, 41 connected in series between the anodes of power amplifier tubes 25, 29 and 27, 31. A capacitor 43 is connected from the junction of these radio frequency chokes 39, 41 to ground at 47. The anodes 45 of power amplifier tubes 25, 29 are connected through a first capacitor 49, a tunable coupling network 51, and a second capacitor 53 to the anodes of power amplifier tubes 27, 31. The coupling network 51 comprises a pair of variable capacitors 55, 57 connected in series across a center-tapped coupling coil 36. The junction of the variable capacitors 55, 57 is connected to the center tap 59 of the coupling coil 36 and to ground at 61. The grids of power amplifier tubes 25, 29 are connected through a capacitor 38 and a radio frequency choke 40 to one terminal 42 of the tunable coupling network, and the grids of power amplifier tubes 27, 31 are connected through a capacitor 44 and a radio frequency choke 46 to the other terminal 48 of the tunable coupling network 51. The antenna coupling coil 50 is connected across the antenna input terminals 37, and in inductive relation to the coupling coil 36 of the tunable network 51. A 10kv. power amplifier plate supply 63, shown as a block, is connected from its high potential side through a filter choke 65 and a modulation reactor 67 to the junction of the radio frequency chokes 39, 41. The junction of the filter choke 65 and the modulation reactor 67 is connected through a capacitor 69 to ground 71.

The audio section of the transmitter includes audio input 73 and first, second, third, and fourth audio amplifiers 75, 77, 79, 81 coupled in that order. The fourth audio amplifier 81 is coupled to the modulator stage which is indicated generally at 83. The modulator stage includes two pairs of paralleled audio amplifier tubes 85, 87, and 89, 91, respectively connected in balanced push-pull relation. The conventional grid and cathode circuits of the modulator are shown as a block 93. The anode output terminals of the modulator 83 are connected through resistance 99, 101, capacitance 103, 105, resistance 107, 109 and capacitance 111, 113, respectively, to ground 115. Feedback is taken from the junctions of the resistance 107, 109 and capacitance 103, 105, respectively, via conductors 118, 119 to the first audio amplifier 75. The output terminals 95, 97 of the modulator tube anode 117 are bridged by a center-tapped reactor 119. The high voltage terminal of a 12 kv. modulator power supply 121, shown as a block, is connected through a filter choke 123 to the center tap 125 of the center-tapped reactor 119 and through a by-pass capacitor 128 to ground 129. The modulator 83 is coupled to the power amplifier 23 by means of a coupling capacitor 127 which is connected from one output terminal 130 of the modulator to a point common to the modulation reactor 67 and the second and third chokes 49, 51, which are connected in the power amplifier output circuit 35.

The use of a center-tapped reactor instead of a modulation transformer in the output circuit of the modulator makes it possible to fully utilize the beneficial effects of feedback. The employment of separate and independent D. C. power amplifier and modulator plate supplies makes it possible to conveniently and efficiently obtain 100% modulation, with a minimum of radio frequency amplifier stages.

We are aware that certain modifications of our invention, without departure from the scope thereof, will appear to those skilled in the art. We desire, therefore, that our invention be given an interpretation as broad as is consistent with the prior art and the spirit of the appended claims.

We claim as our invention:

1. A system of modulation including a modulator having a double-ended output, a center-tapped reactor connected in balanced relation to the output of said modulator, a conductor adapted to connect the center tap of said reactor to a first anode voltage supply, a radio-frequency amplifier, means for coupling said modulator to said radio-frequency amplifier, and a modulation reactor connected from the radio-frequency amplifier side of said coupling means to a terminal which is adapted for connection to a second anode potential source.

2. A pair of electric discharge devices each having an anode, a center-tapped reactor connected in series with said anodes, a conductor adapted to connect the center tap of said reactor to a first source of anode potential, a reactor, a coupling capacitor, a first terminal adapted for connection to a second anode potential source, a conductor connecting said first terminal to one side of said reactor, conductors connecting the other side of said reactor and one side of said coupling capacitor to said second terminal, and a conductor connecting the other side of said coupling capacitor to a point common to said center-tapped reactor and one of said anodes.

3. A system of high level modulation including an audio-frequency amplifier having a double-ended output, said amplifiers including electric discharge devices each having an anode, a cathode, and a control element, a radio-frequency amplifier having a double-ended output, means for coupling the outputs of said amplifiers in single-ended relation, said means including a first reactor connected in balanced relation to the output of said audio-frequency amplifier, a second reactor connected in the anode power supply circuit of said radio-frequency amplifier, a capacitor coupling said reactors, and a connection from the midpoint of said first reactor in the anode power supply circuit of said audio-frequency amplifier, the anode power supplies of said amplifiers being independent of each other.

4. The invention according to claim 3, wherein the potential of the audio-frequency amplifier anode power supply is sufficiently higher than the potential of the radio-frequency amplifier anode power supply that 100% modulation can be obtained.

5. A pair of electric discharge devices having their anodes joined through a first reactor, a capacitor connected to one of said anodes and through a second reactor to a first source of direct current anode potential, a second source of direct current anode potential connected to the midpoint of said first reactor, and capacitors connected to by-pass said potential sources to ground.

6. A pair of electric discharge devices having their anodes joined through a first reactor, a capacitor connected to one of said anodes and through a second reactor to a first source of direct current anode potential, a second source of direct current anode potential independent of and of greater magnitude than said first potential source connected to the midpoint of said first reactor, and capacitors connected to by-pass said potential sources to ground.

RALPH N. HARMON.
REUBEN LEE.

REFERENCES CITED

The following references are of record in the file of this patent:

UNITED STATES PATENTS

| Number | Name | Date |
|---|---|---|
| 1,896,742 | Culver | Feb. 7, 1933 |
| 2,226,214 | Albrecht | Dec. 24, 1940 |
| 2,521,052 | Edwards | Sept. 5, 1950 |